US010789420B2

(12) United States Patent
Mou (10) Patent No.: US 10,789,420 B2
(45) Date of Patent: Sep. 29, 2020

(54) MIXED VIEW DISPLAY METHOD AND DEVICE

(71) Applicant: Alibaba Group Holding Limited, George Town (KY)

(72) Inventor: Qiang Mou, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/135,604

(22) Filed: Sep. 19, 2018

(65) Prior Publication Data

US 2019/0018830 A1  Jan. 17, 2019

Related U.S. Application Data

(63) Continuation of application No. PCT/CN2017/076421, filed on Mar. 13, 2017.

(51) Int. Cl.
*G06F 40/166* (2020.01)
*G06F 8/38* (2018.01)
(Continued)

(52) U.S. Cl.
CPC .............. *G06F 40/166* (2020.01); *G06F 8/38* (2013.01); *G06F 9/44526* (2013.01);
(Continued)

(58) Field of Classification Search
None
See application file for complete search history.

(56) References Cited

U.S. PATENT DOCUMENTS 7,412,644 B2  8/2008 Kieffer
9,037,914 B1 *  5/2015 Au .................. G06F 11/079
714/38.1
(Continued)

FOREIGN PATENT DOCUMENTS

CN  102073502  5/2011
CN  102999613  3/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Howard Cortes
(74) *Attorney, Agent, or Firm* — Fish & Richardson P.C.

(57) ABSTRACT

The present disclosure relates to the field of webpage processing technologies and discloses a mixed view display method and device, to resolve a problem of low accuracy and inconsistency of displaying a mixed view. A webpage view loading instruction to load a webpage view is received by a computing device. The webpage view is rendered by a browser application executing on the computing device. In response to receiving the webpage view loading instruction, the webpage view, including a placeholder element configured to hold a client view, is loaded by the computing device. Location information of the placeholder element is obtained. The client view is added to the webpage view at the location specified by the obtained location information, where the client view is rendered by an operating system of the computing device. The webpage view is provided for presentation on a display.

20 Claims, 6 Drawing Sheets

(51) Int. Cl.
  G06F 9/451    (2018.01)
  G06F 40/106   (2020.01)
  G06F 16/958   (2019.01)
  G06F 16/957   (2019.01)
  G06F 9/445    (2018.01)
  G06F 9/455    (2018.01)

(52) U.S. Cl.
  CPC .......... *G06F 9/452* (2018.02); *G06F 9/45529* (2013.01); *G06F 16/9577* (2019.01); *G06F 16/986* (2019.01); *G06F 40/106* (2020.01)

(56) References Cited

U.S. PATENT DOCUMENTS

| | | | |
|---|---|---|---|
| 9,483,449 B1* | 11/2016 | Wood | G06F 16/957 |
| 9,754,245 B1* | 9/2017 | Davison | G06Q 20/12 |
| 2002/0184337 A1* | 12/2002 | Hyldahl | G06F 16/986 709/218 |
| 2007/0124688 A1* | 5/2007 | Nauerz | G06F 9/543 715/746 |
| 2008/0127133 A1* | 5/2008 | Aghara | H04L 67/02 717/140 |
| 2009/0043777 A1 | 2/2009 | Wyler et al. | |
| 2009/0119607 A1 | 5/2009 | Giambalvo et al. | |
| 2012/0143942 A1* | 6/2012 | Chhabra | G06F 16/986 709/203 |
| 2012/0284632 A1* | 11/2012 | Baird | G06F 9/452 715/749 |
| 2013/0046855 A1 | 2/2013 | Jiang et al. | |
| 2013/0073395 A1* | 3/2013 | Rincon | H04M 3/4878 705/14.66 |
| 2013/0132820 A1* | 5/2013 | Poindessault | G06F 16/958 715/234 |
| 2014/0136945 A1 | 5/2014 | Ligman et al. | |
| 2014/0325343 A1* | 10/2014 | Rao | G06F 17/243 715/234 |
| 2014/0341371 A1* | 11/2014 | Rincon | G06F 40/134 379/355.04 |
| 2015/0019623 A1* | 1/2015 | Garg | H04L 67/02 709/203 |
| 2015/0234930 A1* | 8/2015 | Lakkur | G06F 3/04812 715/240 |
| 2017/0185861 A1* | 6/2017 | Chen | G06K 9/4652 |

FOREIGN PATENT DOCUMENTS

| | | |
|---|---|---|
| CN | 104657118 | 5/2015 |
| CN | 105393222 | 3/2016 |

OTHER PUBLICATIONS

Nakamoto, "Bitcoin: A Peer-to-Peer Electronic Cash System," www.bitcoin.org, 2005, 9 pages.

International Search Report by the International Searching Authority issued in International Application No. PCT/CN2017/076421 dated Jun. 14, 2017; 10 pages.

Chrome.com [online], "<webview> Tag," Oct. 2013, [Retrieved on Aug. 24, 2019], retrieved from: URL<https://developer.chrome.com/apps/tags/webview>, 65 pages.

European Extended Search Report in European Patent Application No. 17769338.9, dated Nov. 13, 2019, 7 pages.

Github.com [online], "[WebView] WebView on android can't execute javascript #5143," Jan. 2016, [Retrieved on Aug. 25, 2019], retrieved from: URL<https://github.com/facebook/react-native/issues/5143>, 8 pages.

Github.com [online], "HTML5 fullscreen api not working in webview—tag #1503," May 2015, [Retrieved on Aug. 24, 2019], retrieved from: URL<https://github.com/electron/electron/issues/1503>, 9 pages.

International Preliminary Report on Patentability in International Application No. PCT/CN2017/076421, dated Sep. 25, 2018, 10 pages (with English Translation).

Musciano et al, "Embedded Content," in HTML & XHTML: The Definitive Guide, 4th Edition, Aug. 1, 2020, 11 pages.

* cited by examiner

MIXED VIEW DISPLAY METHOD AND DEVICE

CROSS-REFERENCE TO RELATED APPLICATIONS

This application is a continuation of PCT Application No. PCT/CN2017/076421, filed on Mar. 13, 2017, which claims priority to Chinese Patent Application No. 201610172774.1, filed on Mar. 24, 2016, and each application is hereby incorporated by reference in its entirety.

TECHNICAL FIELD

The present disclosure relates to the field of webpage processing technologies, and in particular, to a mixed view display method and device.

BACKGROUND

With the rapid development of information technologies, people have increasingly high requirements for an application (App) on a mobile device. Due to limitation of the mobile device, the App on the mobile device changes from a native App to a hybrid App and then to a web-based App (web App) in response to technology update and market demand. The hybrid App means an App between the web App and the native App. A webpage view and a client view of a certain App can be both displayed by using the hybrid App. The webpage view is a Hypertext Markup Language version 5 (HTML5) page running on a browser. The client view is a page or a control for display that is written by using the iOS/Android development language. For example, a webpage view and a client view of the App Taobao can be displayed in a mixed way by using the hybrid App.

Currently, a subview can be added to the WebView (a client webpage container) of a mobile device to implement the hybrid App. To be specific, a webpage view and a client view of an App are displayed in a mixed way by adding the client view to the WebView. For example, the client view is added to web View.scrollView in the iOS system, or the client view is added to webview.addView in the Android system, to directly add the client view to the WebView. However, the webpage view relies on a browser engine for rendering, and the client view relies on compilation of an operating system for running. Because of the two different environments, a mixed view is displayed inconsistently when a scroll change is made to the webpage view.

SUMMARY

In view of the earlier described problem, the present disclosure is proposed to provide a mixed view display method and device for resolving the problem or at least partially resolving the problem.

To achieve the objective, the present disclosure provides the following technical solutions:

According to one aspect, an implementation of the present disclosure provides a mixed view display method, and the method includes the following: loading a webpage view when a webpage view loading instruction is received, where the webpage view includes a placeholder element that is used to add a client view; obtaining location information of the placeholder element from a result of loading the webpage view; adding the client view to the location information; and displaying the webpage view that includes the added client view.

According to another aspect, an implementation of the present disclosure further provides a mixed view display device, and the device includes the following: a loading unit, configured to load a webpage view when a webpage view loading instruction is received, where the webpage view includes a placeholder element that is used to add a client view; an acquisition unit, configured to obtain location information of the placeholder element from a result of loading the webpage view; an adding unit, configured to add the client view to the location information; and a display unit, configured to display the webpage view that includes the added client view.

The technical solutions provided in the implementations of the present disclosure have at least the following advantages:

The implementations of the present disclosure provide the mixed view display method and device. First, the webpage view is loaded when the webpage view loading instruction is received, where the webpage view includes the placeholder element that is used to add the client view. Then, the location information of the placeholder element is obtained from the result of loading the webpage view, and the client view is added to the location information. Eventually, the webpage view that includes the added client view is displayed. In comparison to a subview being directly added to a WebView to display a mixed view, in the implementations of the present disclosure, the location information of the placeholder element is first obtained from the result of loading the webpage view when the webpage view loading instruction is received. Then, the client view is added to a location of the placeholder element to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading and can improve accuracy and consistency of displaying a mixed view.

BRIEF DESCRIPTION OF DRAWINGS

Various other advantages and benefits are clearly understood by a person of ordinary skill in the art by reading the detailed descriptions of the following implementations. The accompanying drawings are merely used to illustrate the implementations, and are not used to limit the present disclosure. In addition, the same reference symbols are used to represent the same components in the drawings. In the accompanying drawings.

DESCRIPTION OF IMPLEMENTATIONS

The following describes example implementations of the present disclosure in detail with reference to the accompanying drawings. Although the accompanying drawings show the example implementations of the present disclosure, it should be understood that the present disclosure can be implemented in various forms, and shall not be limited by the implementations described here. Instead, these implementations are used to provide a more thorough understanding of the present disclosure and to comprehensively convey the scope of the present disclosure to a person skilled in the art.

The present disclosure is described in detail in the following with reference to the accompanying drawings and implementations, to make advantages of the technical solutions of the present disclosure clearer.

Figure 1:
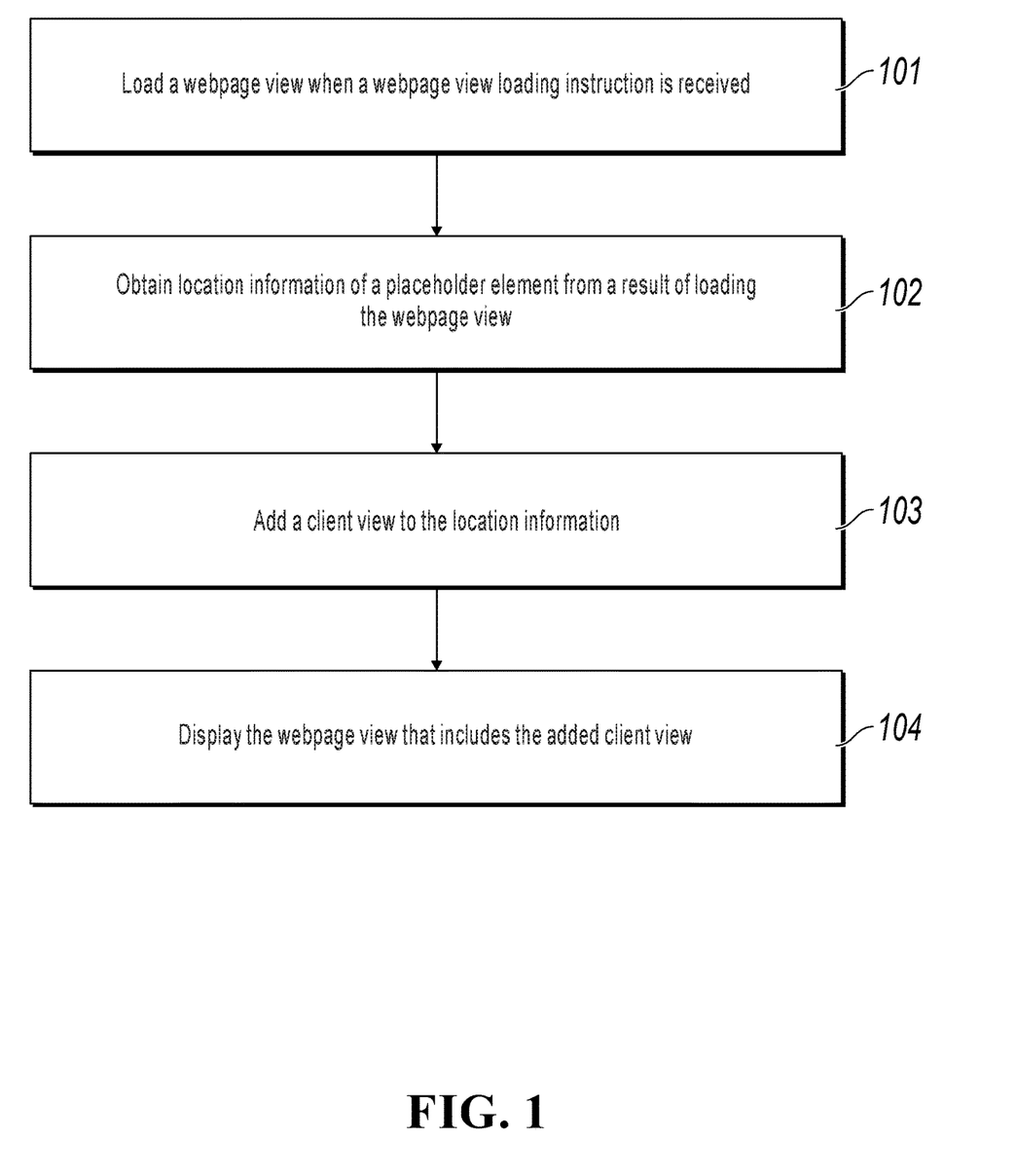
FIG. 1 is a flowchart illustrating a mixed view display method, according to an implementation of the present disclosure.

An implementation of the present disclosure provides a mixed view display method. As shown in FIG. 1, the method includes the following steps:

101. Load a webpage view when a webpage view loading instruction is received.

The webpage view includes a placeholder element that is used to add a client view. In the present implementation of the present disclosure, the webpage view loading instruction can be triggered by opening a specific page of an App, for example, selecting a repayment button of the Credit Pay in the Alipay or a purchase reservation button in the ZhaoCai-Bao. It is not limited in the present implementation of the present disclosure.

It is worthwhile to note that the placeholder element included in the webpage view is an element that can change a size or a width/height of an object. In the present implementation of the present disclosure, the placeholder element can be a block-level element, or the placeholder element can be represented as a row-level element of a block-level element. It is not limited in the present implementation of the present disclosure. For example, the placeholder element is represented by using a block-level element <div id="native-view"></div>, or the placeholder element is represented by using a row-level element of a block-level element <span id="native-view" style="display:block"></span>. Because style="display:block" that is set in the row-level element means to change an object to a block-level element, the row-level element is actually represented as a block-level element, and the row-level element is used to change a corresponding size or width.

102. Obtain location information of a placeholder element from a result of loading the webpage view.

In the present implementation of the present disclosure, because the webpage view is an HTML page, the to-be-displayed webpage view is loaded for display by using a browser rendering engine. It is worthwhile to note that loading of different webpage views is internally monitored by different operating systems of terminal devices in the present disclosure. For example, whether the webpage view has been loaded is monitored by using the interface web ViewDidFinishLoad (iOS) in the iOS (an operating system in an Apple mobile device); and whether the webpage view has been loaded is monitored by using the interface onPageFinished (Android) in the Android (Android operating system).

In the present implementation of the present disclosure, the WebView (a client webpage view container) executes the JavaScript (a scripting language) to obtain the location information of the placeholder element from the result of loading the to-be-displayed webpage view. There are different methods for obtaining a placeholder element based on different methods for marking a placeholder element. For example, script code for obtaining location information of a placeholder element is as follows:

```
(function( ){
    var ele = document.getElementById('native-view');
    var xPoint = ele.getBoundingClientRect( ).left;
    var yPoint = ele.getBoundingClientRect( ).top +
    document.body.scrollTop;
    return JSON.stringify({x: xPoint, y: yPoint});
})( );
```

In the code, 'native-view' indicates an identifier of a placeholder element, xPoint indicates left location distance information of the placeholder element relative to a browser window, and yPoint is used to obtain an upper location of the placeholder element relative to the browser window on a page. A location of the placeholder element can be determined from the result of loading the webpage view based on x and y in a coordinate axis.

103. Add a client view to the location information.

The client view is a native view control that is written and compiled by using a corresponding operating system language of a mobile phone, for example, the iOS UISwitch (a switch control), the Android TextView (a text display), or a custom view control written by a user.

104. Display the webpage view that includes the added client view.

In the present implementation of the present disclosure, first, the location information of the placeholder element is obtained from the result of loading the webpage view when the webpage view loading instruction is received; then, the client view is correspondingly added to a location of the placeholder element, to display the webpage view and the client view in a mixed way. The placeholder element in the present implementation of the present disclosure can be rendered by using a browser engine. Therefore, the client view can scroll with the webpage view by adding the client view to the location corresponding to the placeholder element after the loading. The present disclosure can improve accuracy and consistency of displaying a mixed view.

The present implementation of the present disclosure provides the mixed view display method. First, the webpage view is loaded when the webpage view loading instruction is received, where the webpage view includes the placeholder element that is used to add the client view. Then, the location information of the placeholder element is obtained from the result of loading the webpage view, and the client view is added to the location information. Eventually, the webpage view that includes the added client view is displayed. In comparison to a subview being directly added to a WebView to display a mixed view, in the implementations of the present disclosure, the location information of the placeholder element is first obtained from the result of loading the webpage view when the webpage view loading instruction is received. Then, the client view is added to a location of the placeholder element to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading. The present disclosure can improve accuracy and consistency of displaying a mixed view.

Figure 2:
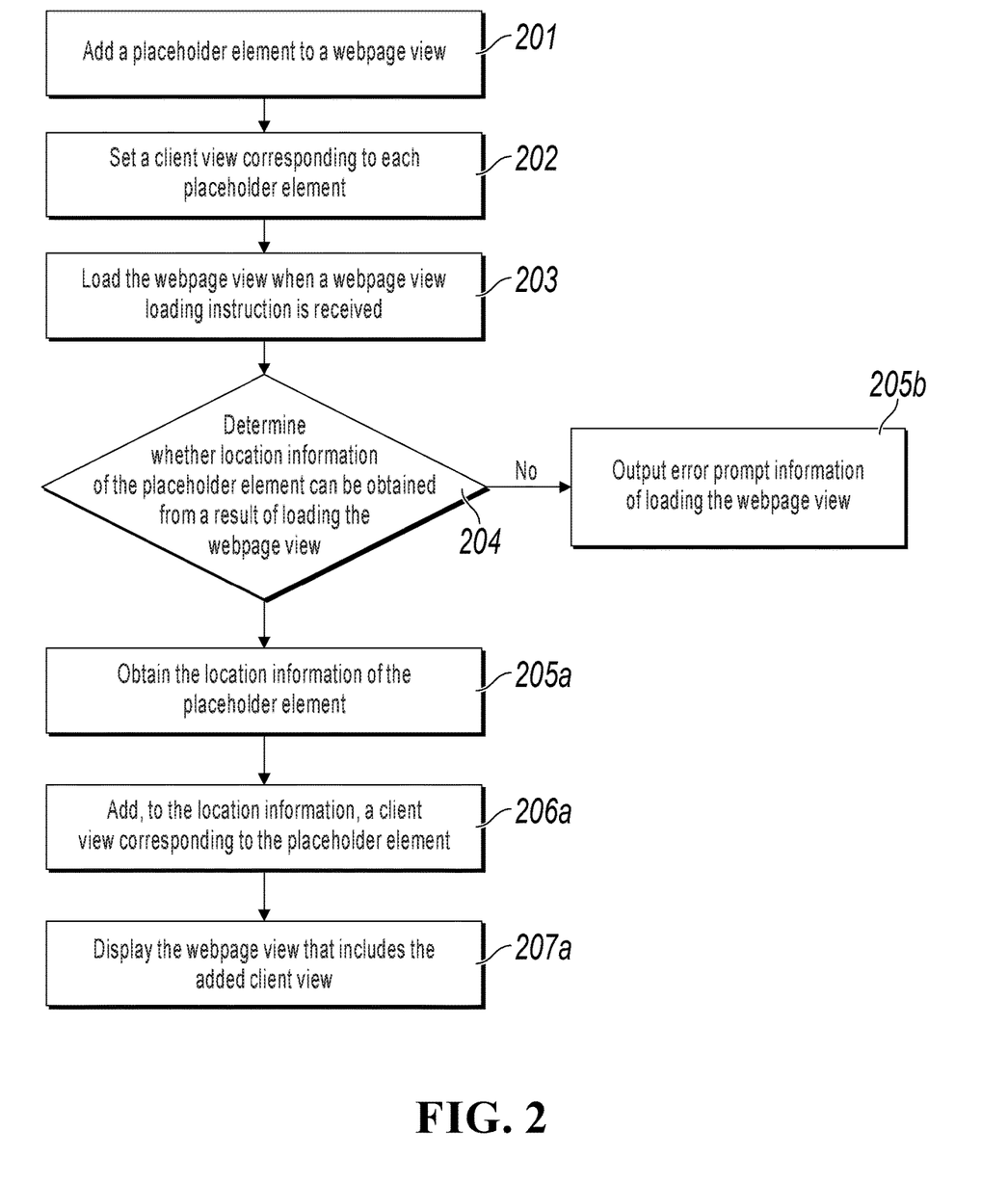
FIG. 2 is a flowchart illustrating another mixed view display method, according to an implementation of the present disclosure.

An implementation of the present disclosure provides another mixed view display method. As shown in FIG. 2, the method includes the following steps:

201. Add a placeholder element to a webpage view.

Corresponding identification information is set for each placeholder element, and the identification information is used to uniquely identify the placeholder element. The identification information corresponding to each placeholder element can be set by using class or id. For example, in a placeholder element represented by using a block-level element <div class="native-view1"></div>, identification information of the placeholder element is set by using class, that is, the identification information of the placeholder element is native-view1. In a placeholder element represented by using a row-level element of a block-level element <span id="native-view2" style="display:block"></span>, identification information of the placeholder element is set by using id, that is, the identification information of the placeholder element is native-view2.

It is worthwhile to note that the placeholder element included in the webpage view is an element that can change a size or a width/height of an object. In the present implementation of the present disclosure, the placeholder element can be a block-level element, or the placeholder element can be represented as a row-level element of a block-level element. It is not limited in the present implementation of the present disclosure. In the present implementation of the present disclosure, the placeholder element is set to a block-level element, or the placeholder element is represented as a row-level element of a block-level element. A width/height of the placeholder element can be set in a later step. To be specific, a size of a client view can be adjusted by using the placeholder element. Therefore, the present implementation of the present disclosure can improve accuracy and consistency of displaying a client view.

202. Set a client view corresponding to each placeholder element.

The client view is a native view control that is written and compiled by using a corresponding operating system language of a mobile phone, for example, the iOS UISwitch (a switch control), the Android TextView (a text display), or a custom view control written by a user. It is not limited in the present implementation of the present disclosure. It is worthwhile to note that, because the webpage view may include multiple client views and one client view can be added to each placeholder element, client views corresponding to the placeholder elements further need to be set after the multiple placeholder elements are added to the webpage view. In the present implementation of the present disclosure, the client views corresponding to the placeholder elements are set so that the multiple client views can be added to location information corresponding to the placeholder elements in a later step.

203. Load the webpage view when a webpage view loading instruction is received.

The webpage view includes the placeholder element that is used to add the client view. In the present implementation of the present disclosure, the webpage view loading instruction can be triggered by opening a specific page of an App, for example, selecting a repayment button of the Credit Pay in the Alipay or a purchase reservation button in the Zhao-CaiBao. It is not limited in the present implementation of the present disclosure.

204. Determine whether location information of the placeholder element can be obtained from a result of loading the webpage view.

It is worthwhile to note that webpage view loading is internally listened in different operating systems of terminal devices in the present disclosure. For example, whether the webpage view has been loaded is learned by using the interface web ViewDidFinishLoad (iOS) in the iOS (an operating system in an Apple mobile device); and whether the webpage view has been loaded is learned by using the interface onPageFinished (Android) in the Android (Android operating system). The location information of the placeholder element is a location of a page element in a viewable area, and the left and top locations of the placeholder element are located relative to a browser window.

205a. If yes, obtain the location information of the placeholder element.

In the present implementation of the present disclosure, the location information of the placeholder element is obtained if the location information of the placeholder element can be obtained from the result of loading the to-be-displayed webpage view.

206a. Add, to the location information, a client view corresponding to the placeholder element.

In the present implementation of the present disclosure, the placeholder element is represented as a block-level element. After step 206a, the method further includes the following: configuring status information of the placeholder element as status information corresponding to the client view. The status information of the placeholder element can be width/height information, resolution information, etc. of a status element. It is not limited in the present implementation of the present disclosure. It is worthwhile to note that, the placeholder element is represented as a block-level element, which can be as follows: The placeholder element is a block-level element, or the placeholder element is represented as a row-level element of a block-level element, that is, all elements that can change the status information of the placeholder element. It is not limited in the present implementation of the present disclosure.

In the present implementation of the present disclosure, the configuring status information of the placeholder element as status information corresponding to the client view includes the following: setting the width/height information of the placeholder element to width/height information corresponding to the client view. For example, the width/height information of the element can be set by using the following code:

document.getElementById('native-view')
  .style.height='400px';
document.getElementById('native-view')
  .style.width='100px';

400 is an actual height of the client view, and 100 is an actual width of the client view. In the present implementation of the present disclosure, the width/height information of the placeholder element is set to the width/height information corresponding to the client view so that the added client view is fully displayed in the to-be-displayed webpage view. Further, the width/height information of the placeholder element is set to the width/height information corresponding to the client view, to improve accuracy of displaying a client view and further improve accuracy and consistency of displaying a mixed view.

In the present implementation of the present disclosure, the adding a client view to the location information includes the following: obtaining location information corresponding to each placeholder element from the result of loading the webpage view; and adding, to the location information, a client view corresponding to the placeholder element. In the present implementation of the present disclosure, if there are multiple placeholder elements in the webpage view, the location information corresponding to each placeholder element is obtained from the loading result after the webpage view has been loaded, and then, the client view corresponding to the placeholder element is added to the location information of each placeholder element, to add the multiple client views to the webpage view.

207a. Display the webpage view that includes the added client view.

205b. If no, output error prompt information of loading the webpage view.

Step 205b is in parallel with step 205a. The error prompt information of loading the webpage view is output if the location information of the placeholder element cannot be obtained from the result of loading the webpage view, to instruct reloading of the webpage view. It is worthwhile to note that the location information of the placeholder element cannot be obtained from the result of loading the webpage view if a terminal device is disconnected from a network, or an error occurs in the webpage view loading process, etc.

Figure 5:
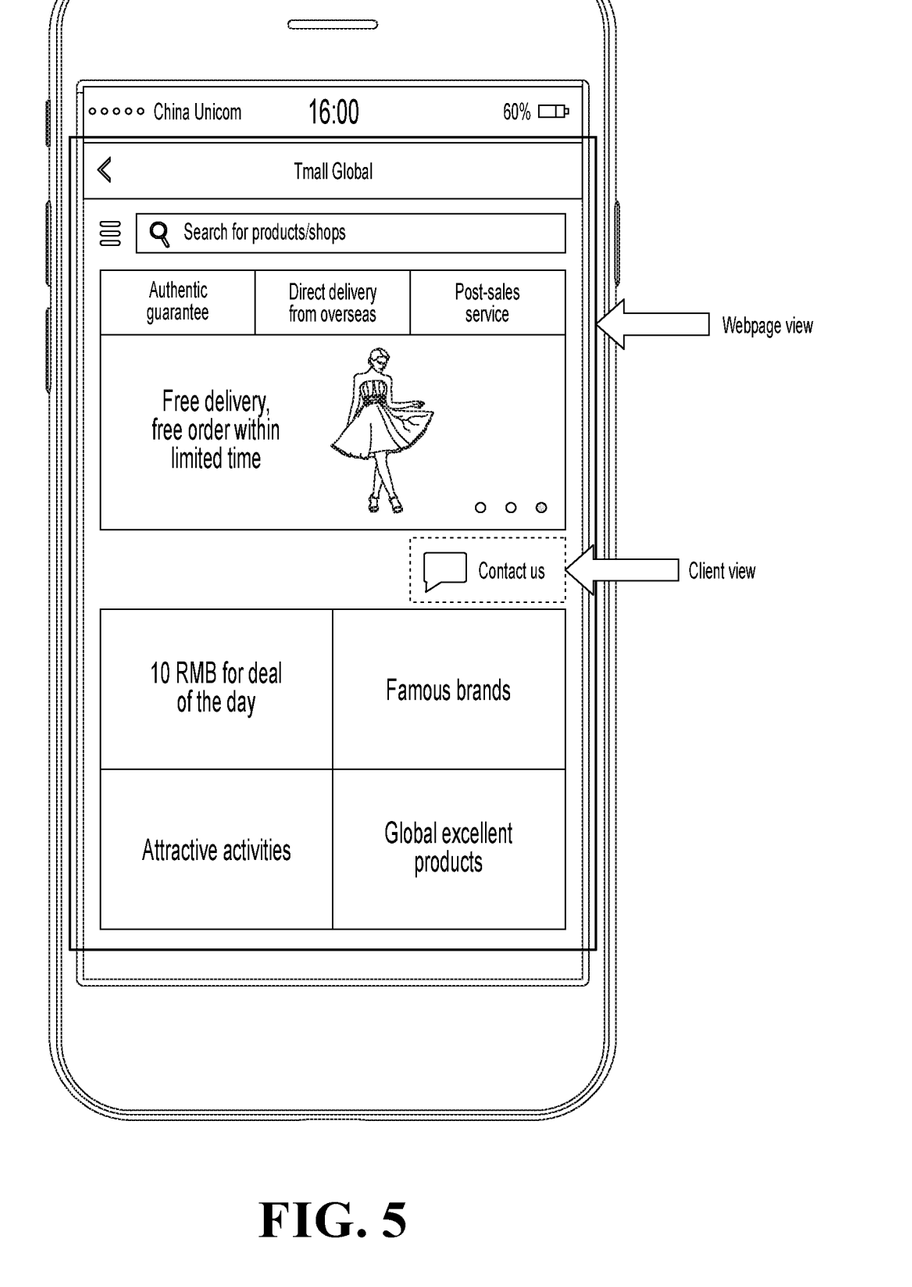
FIG. 5 is a schematic diagram illustrating an interface of a mixed view, according to an implementation of the present disclosure.

The implementations of the present disclosure can be applied to, but is not limited to, a scenario shown in FIG. 5. The scenario includes the following content: First, a webpage view is loaded when a webpage view loading instruction is received, that is, a webpage element in a dashed-line box of the webpage view in FIG. 5 is loaded. Then, whether location information of a placeholder element can be obtained from a result of loading the webpage view is determined, that is, whether location information of a placeholder element "Contact us" can be obtained from the result of loading the webpage view. If yes, the location information of the placeholder element "Contact us" is obtained, and a client view is added to the location information obtained from the WebView, that is, the client view is added to the WebView at a corresponding location of the "Contact us" dashed-line box in FIG. 5, to display the webpage view and the client view in a mixed way. If no, error prompt information of loading the webpage view is output, to instruct reloading of the webpage view. The placeholder element in the present implementation of the present disclosure can be rendered by using a browser engine. Therefore, the client view is added to a location corresponding to the placeholder element after the loading so that the client view can scroll with the webpage view, that is, the client view in the "Contact us" dashed-line box in FIG. 5 can scroll with the webpage view in a webpage view dashed-line box. The placeholder element is added to the webpage view, to display a mixed view in a flow layout, so that the present disclosure can improve accuracy and consistency of displaying a mixed view.

The present implementation of the present disclosure provides the other mixed view display method. First, the webpage view is loaded when the webpage view loading instruction is received, where the webpage view includes the placeholder element that is used to add the client view. Then, the location information of the placeholder element is obtained from the result of loading the webpage view, and the client view is added to the location information. Eventually, the webpage view that includes the added client view is displayed. In a current method, a subview is directly added to a WebView to display a mixed view. In comparison with the earlier described current method, in the implementations of the present disclosure, first, the location information of the placeholder element is obtained from the result of loading the webpage view when the webpage view loading instruction is received; then, the client view is added to a location of the placeholder element, to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading. The present disclosure can improve accuracy and consistency of displaying a mixed view.

Figure 3:
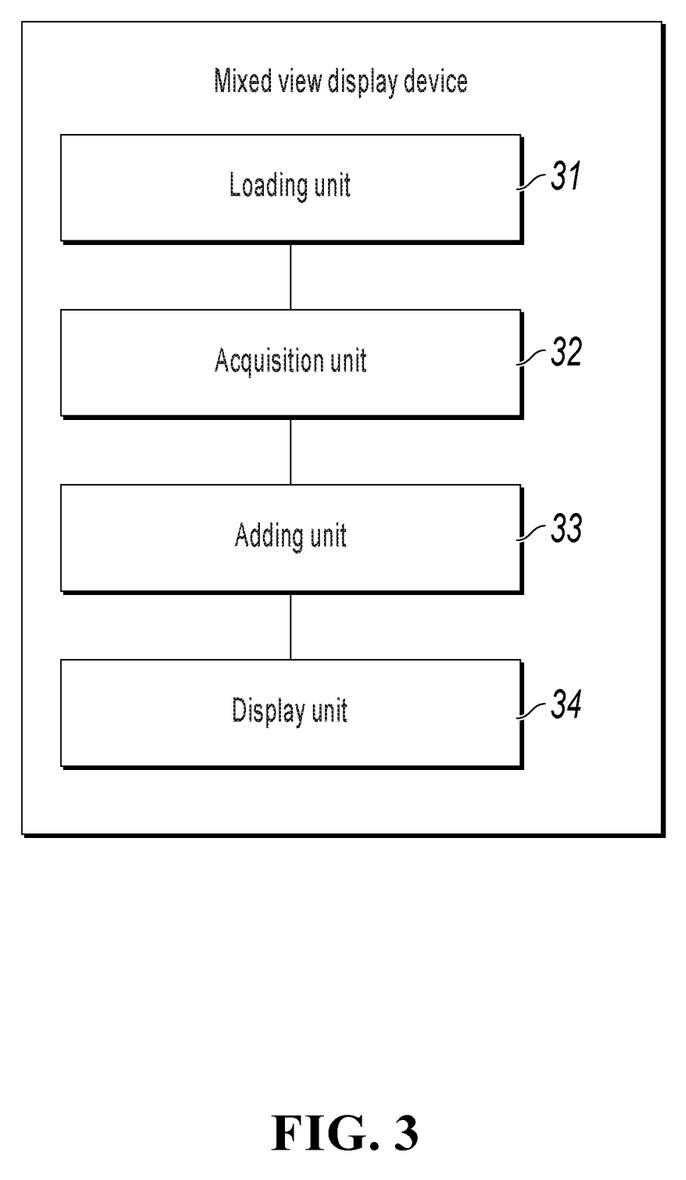
FIG. 3 is a composition block diagram illustrating a mixed view display device, according to an implementation of the present disclosure.

Further, an implementation of the present disclosure provides a mixed view display device. As shown in FIG. 3, the device includes a loading unit 31, an acquisition unit 32, an adding unit 33, and a display unit 34.

The loading unit 31 loads a webpage view when a webpage view loading instruction is received, where the webpage view includes a placeholder element that is used to add a client view.

The acquisition unit 32 obtains location information of the placeholder element from a result of loading the webpage view.

The adding unit 33 adds the client view to the location information.

The display unit 34 displays the webpage view that includes the added client view.

It is worthwhile to note that reference can be made to a corresponding description of the method shown in FIG. 1 for other corresponding descriptions of the functional units involved in the mixed view display device provided in the present implementation of the present disclosure. Details are omitted here for simplicity. However, it is worthwhile to note that the device in the present implementation can correspondingly implement all content in the previous method implementations.

The present implementation of the present disclosure provides the mixed view display device. First, the webpage view is loaded when the webpage view loading instruction is received, where the webpage view includes the placeholder element that is used to add the client view. Then, the location information of the placeholder element is obtained from the result of loading the webpage view, and the client view is added to the location information. Eventually, the webpage view that includes the added client view is displayed. In a current method, a subview is directly added to a WebView to display a mixed view. In comparison with the earlier described current method, in the implementations of the present disclosure, first, the location information of the placeholder element is obtained from the result of loading the webpage view when the webpage view loading instruction is received; then, the client view is added to a location of the placeholder element, to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading. The present disclosure can improve accuracy and consistency of displaying a mixed view.

Figure 4:
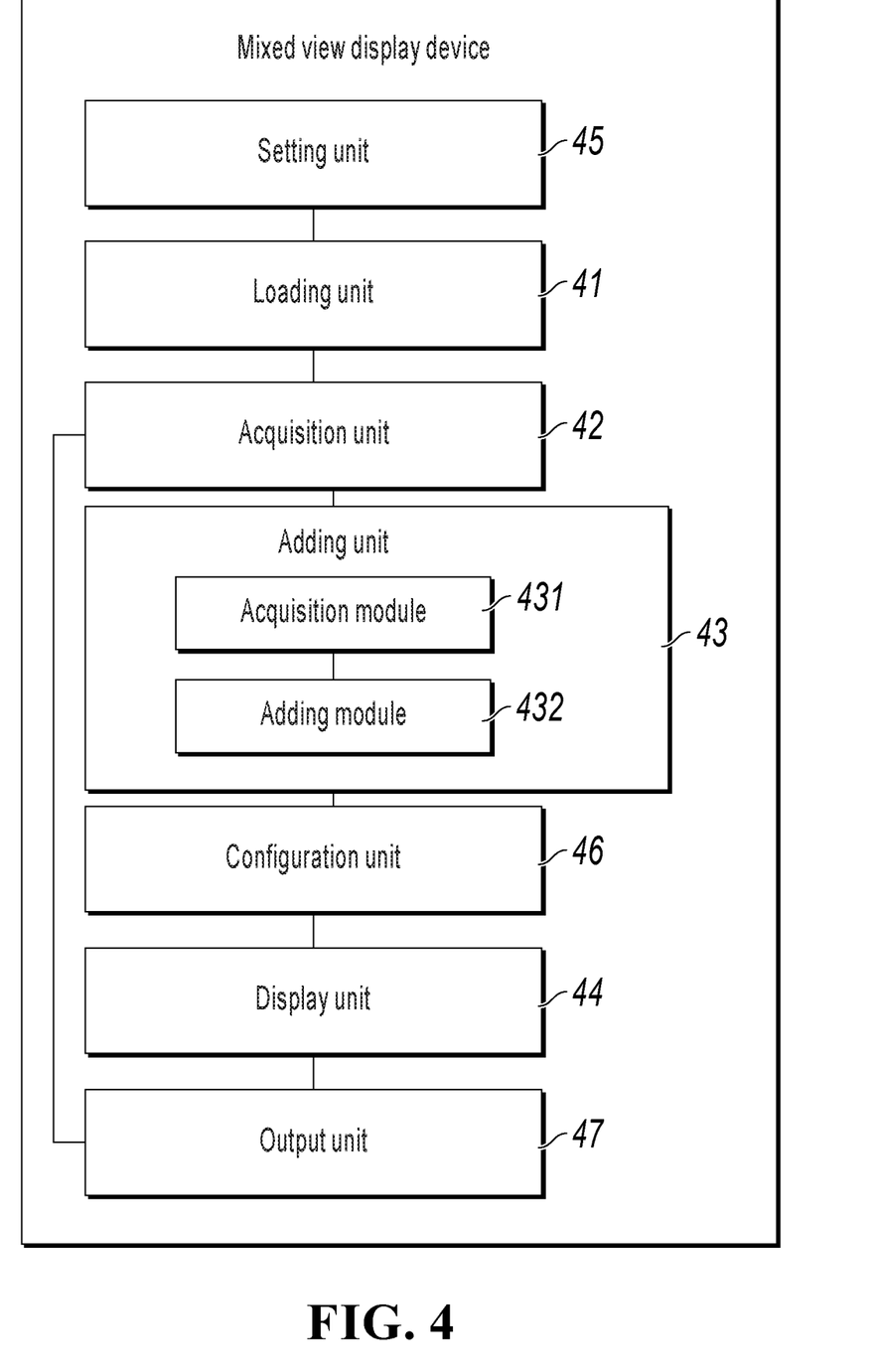
FIG. 4 is a composition block diagram illustrating another mixed view display device, according to an implementation of the present disclosure.

Further, an implementation of the present disclosure provides another mixed view display device. As shown in FIG. 4, the device includes a loading unit 41, an acquisition unit 42, an adding unit 43, and a display unit 44.

The loading unit 41 loads a webpage view when a webpage view loading instruction is received, where the webpage view includes a placeholder element that is used to add a client view.

The acquisition unit 42 obtains location information of the placeholder element from a result of loading the webpage view.

The adding unit 43 adds the client view to the location information.

The display unit 44 displays the webpage view that includes the added client view.

In the present implementation of the present disclosure, the device further includes a setting unit 45.

The adding unit 43 adds the placeholder element to the webpage view, where corresponding identification information is set for each placeholder element.

The setting unit 45 sets a client view corresponding to each placeholder element.

In the present implementation of the present disclosure, the placeholder element is represented as a block-level element. The device further includes: a configuration unit 46, configured to configure status information of the placeholder element as status information corresponding to the client view.

The configuration unit 46 sets width/height information of the placeholder element to width/height information corresponding to the client view.

In the present implementation of the present disclosure, the adding unit 43 includes the following: an acquisition module 431, configured to obtain location information corresponding to each placeholder element from the result of loading the webpage view; and an adding module 432, configured to add, to the location information, a client view corresponding to the placeholder element.

In the present implementation of the present disclosure, the device further includes the following: an output unit 47, configured to output error prompt information of loading the webpage view, if the location information of the placeholder element is not obtained from the result of loading the webpage view.

It is worthwhile to note that reference can be made to a corresponding description of the method shown in FIG. 2 for other corresponding descriptions of the functional units involved in the mixed view display device provided in the present implementation of the present disclosure. Details are omitted here for simplicity. However, it is worthwhile to note that the device in the present implementation can correspondingly implement all content in the previous method implementations.

The present implementation of the present disclosure provides another mixed view display device. First, the webpage view is loaded when the webpage view loading instruction is received, where the webpage view includes the placeholder element that is used to add the client view. Then, the location information of the placeholder element is obtained from the result of loading the webpage view, and the client view is added to the location information. Eventually, the webpage view that includes the added client view is displayed. In a current method, a subview is directly added to a WebView to display a mixed view. In comparison with the earlier described current method, in the implementations of the present disclosure, first, the location information of the placeholder element is obtained from the result of loading the webpage view when the webpage view loading instruction is received; then, the client view is added to a location of the placeholder element, to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading. The present disclosure can improve accuracy and consistency of displaying a mixed view.

The mixed view display device includes a processor and a memory. The loading unit, the acquisition unit, the adding unit, the display unit, the setting unit, the configuration unit, the output unit, etc., are stored in the memory as program units. The processor executes the program units stored in the memory to implement corresponding functions.

The processor includes a kernel. The kernel invokes the corresponding program units from the memory. There can be one or more kernels. Accuracy of displaying a mixed view is improved by adjusting a kernel parameter.

The memory can include a non-persistent memory, a random access memory (RAM), a nonvolatile memory, etc. in a computer readable medium, for example, a read-only memory (ROM) or a flash memory (flash RAM). The memory includes at least one storage chip.

The present application further provides a computer program product. When a data processing device executes the computer program product, program code for initialization includes the following method steps: loading a to-be-displayed webpage view when a webpage view display location switch instruction is received, where the to-be-displayed webpage view includes a placeholder element that is used to add a client view; obtaining location information of the placeholder element from a result of loading the to-be-displayed webpage view; adding the client view to the location information; and displaying the webpage view that includes the added client view.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The present application is described with reference to the flowcharts and/or block diagrams of the method, the device, and the computer program product based on the implementations of the present application. It should be understood that computer program instructions can be used to implement each process and/or each block in the flowcharts and/or the block diagrams, and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or another programmable data processing device to work in a specific way so that the instructions stored in the computer readable memory generate an artifact that includes an instruction device. The instruction device implements a specific function in one or more processes in the flowcharts and/or in one or more blocks in the block diagrams.

These computer program instructions can be loaded to the computer or another programmable data processing device so that a series of operation steps are performed on the computer or the other programmable device for computer-implemented processing. Therefore, the instructions executed on the computer or the other programmable device provide steps for implementing a specific function in one or more processes in the flowcharts and/or in one or more blocks in the block diagrams.

In typical configuration, a computing device includes one or more central processing units (CPU), an input/output interface, a network interface, and a memory.

The memory may include a non-persistent memory, a random access memory (RAM), a nonvolatile memory, etc. in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access machine (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory computer-readable media (transitory media), for example, a modulated data signal and carrier.

The previous descriptions are merely the implementations of the present application, but are not intended to limit the present application. For a person skilled in the art, the present application can have various modifications and changes. Any modifications, equivalent replacements, improvements, etc. made without departing from the spirit and principle of the present application shall fall within the scope of the claims in the present application.

Figure 6:
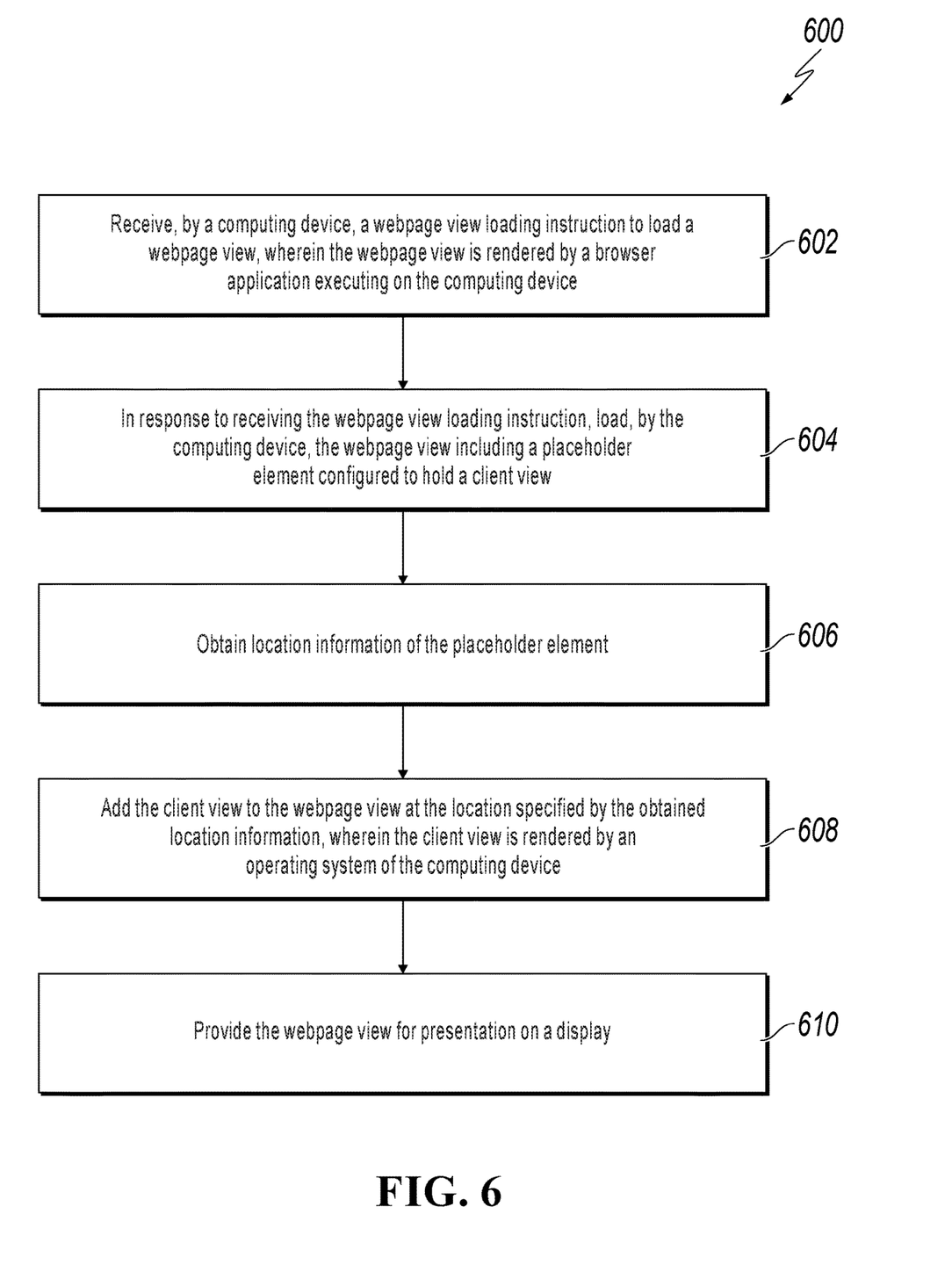
FIG. 6 is a flowchart illustrating an example of a computer-implemented method for providing a client view on a webpage view, according to an implementation of the present disclosure.

FIG. 6 is a flowchart illustrating an example of a computer-implemented method 600 for providing a client view on a webpage view, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a webpage view loading instruction to load a webpage view is received by a computing device. The webpage view is rendered by a browser application executing on the computing device, such as the mobile device depicted in FIG. 5. For example, referring to FIG. 5, the webpage view can be a webpage implemented in HTML5 and configured to run on a browser. The client view can be a control (for example, a user-selectable "Contact us" box) that is configured to be inserted into the webpage. The client view can be implemented in a development language different from HTML5 that is used to implement the webpage view. From 602, method 600 proceeds to 604.

At 604, in response to receiving the webpage view loading instruction, the webpage view, including a placeholder element configured to hold a client view, is loaded by the computing device. As an example, the loading unit 31 can load the webpage view depicted in FIG. 5 after the webpage view loading instruction is received. The webpage view can include a placeholder element that is used to add the client view (for example, the user-selectable "Contact us" box). From 604, method 600 proceeds to 606.

At 606, location information of the placeholder element is obtained. As an example, the acquisition unit 32 can obtain location information of the placeholder element from a result of loading the webpage view. The location of the placeholder element can be determined from the result of loading the webpage view based on x and y coordinates on the display of the mobile device depicted in FIG. 5. From 606, method 600 proceeds to 608.

At 608, the client view is added to the webpage view at the location specified by the obtained location information, where the client view is rendered by an operating system of the computing device. For example, the adding unit 33 can add the user-selectable "Contact us" box to the display of the mobile device depicted in FIG. 5. The user-selectable "Contact us" box can be added at a location identified by the location information. From 608, method 600 proceeds to 610.

At 610, the webpage view is provided for presentation on a display. As an example, the display unit 34 can display, on the mobile device depicted in FIG. 5, the webpage view that includes the added client view. After 610, method 600 stops.

In some implementations, method 600 can further include steps for establishing the client view. For example, before loading the webpage view, the placeholder element can be added to the webpage view. Identification information corresponding to each placeholder element of the webpage view can be defined. A client view corresponding to each placeholder element can be set.

In some implementations, adding the client view to the webpage view can include obtaining location information corresponding to each placeholder element from the result of loading the webpage view and adding, to the webpage view, the client view corresponding to the placeholder element. For example, during the time that the loading unit 31 is loading the webpage view depicted in FIG. 5, the loading unit 31 can capture location information of the client view, such as the x and y coordinates on the display of the mobile device.

In some implementations, the placeholder element can be represented as a block-level element. For example, the placeholder element can be represented using a block-level element <div id="native-view"></div>, or the placeholder element can be represented by using a row-level element of a block-level element <span id="native-view" style="display:block"></span>.

In some implementations, method 600 can further include configuring status information of the placeholder element as status information corresponding to the client view. For example, the configuration unit 46 can set width/height information of the placeholder element to width/height information corresponding to the client view. The status information of the placeholder element can include, for example, width, height, and resolution information associated with the status element. Configuring the status information can occur after the client view is added to the webpage view.

In some implementations, method 600 can further include outputting error prompt information of loading the webpage view if the location information of the placeholder element is not obtained from the result of loading the webpage view. As an example, the loading unit 31 can display an error message somewhere within the webpage view depicted in FIG. 5 if location information cannot be obtained for the placeholder element of the user-selectable "Contact us" box.

Techniques in the present disclosure can be used to provide a client view on a webpage view. However, the webpage view may rely on a browser engine for rendering, and the client view may rely on compilation of an operating system for running. Because of the two different environments, a mixed view may be displayed inconsistently when a scroll change is made to the webpage view. In comparison to a subview being directly added to a WebView to display a mixed view, the location information of the placeholder element can first be obtained from the result of loading the webpage view when the webpage view loading instruction is received. Then, the client view can be added to a location of the placeholder element to display the webpage view and the client view in a mixed way. The placeholder element in the implementations of the present disclosure can be rendered by using a browser engine. Therefore, the client view can scroll with the webpage view by adding the client view to the location corresponding to the placeholder element after the loading and can improve accuracy and consistency of displaying a mixed view.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, by a computing device, a webpage view loading instruction to load code for a webpage view, wherein the webpage view is rendered by a browser application executing on the computing device;
   in response to receiving the webpage view loading instruction, loading, by the computing device, the code for the webpage view, the code including a placeholder element over which client view controls that are written using a development language associated with a mobile operating system are added when generating mixed views;
   obtaining location information indicating a current position of the placeholder element within a browser window of the browser application;
   generating a mixed view, comprising adding the client view control to the webpage view at the current position of the placeholder element within the browser window of the browser application; and
   providing the mixed view for presentation on a display.

2. The computer-implemented method of claim 1, further comprising:
   before loading the webpage view, adding the placeholder element to the webpage view;
   defining identification information corresponding to each placeholder element of the webpage view; and
   setting a client view corresponding to each placeholder element.

3. The computer-implemented method of claim 2, wherein the placeholder element is represented as a block-level element.

4. The computer-implemented method of claim 3, further comprising:
   after the adding the client view to the webpage view, configuring status information of the placeholder element as status information corresponding to the client view.

5. The computer-implemented method of claim 4, wherein the configuring status information of the placeholder element as status information corresponding to the client view comprises:
   setting width and height attributes of the placeholder element based on the client view.

6. The computer-implemented method of claim 2, wherein the adding the client view to the webpage view comprises:
   obtaining location information corresponding to each placeholder element from the result of loading the webpage view; and
   adding, to the webpage view, the client view corresponding to the placeholder element.

7. The computer-implemented method of claim 1, further comprising:
   outputting error prompt information of loading the webpage view if the location information of the placeholder element is not obtained from the result of loading the webpage view.

8. The computer-implemented method of claim 1, wherein the webpage view is a webpage implemented in Hypertext Markup Language version 5 (HTML5) and configured to run on a browser, and wherein the client view is a control configured to be inserted into the webpage and implemented in a development language different from HTML5.

9. A non-transitory, computer-readable medium storing one or more instructions executable by a computer system to perform operations comprising:
   receiving, by a computing device, a webpage view loading instruction to load code for a webpage view, wherein the webpage view is rendered by a browser application executing on the computing device;
   in response to receiving the webpage view loading instruction, loading, by the computing device, the code for the webpage view, the code including a placeholder element over which client view controls that are written using a development language associated with a mobile operating system are added when generating mixed views;
   obtaining location information indicating a current position of the placeholder element within a browser window of the browser application;
   generating a mixed view, comprising adding the client view control to the webpage view at the current position of the placeholder element within the browser window of the browser application; and
   providing the mixed view for presentation on a display.

10. The non-transitory, computer-readable medium of claim 9, the operations further comprising:
 before loading the webpage view, adding the placeholder element to the webpage view;
 defining identification information corresponding to each placeholder element of the webpage view; and
 setting a client view corresponding to each placeholder element.

11. The non-transitory, computer-readable medium of claim 10, wherein the placeholder element is represented as a block-level element.

12. The non-transitory, computer-readable medium of claim 11, the operations further comprising:
 after the adding the client view to the webpage view, configuring status information of the placeholder element as status information corresponding to the client view.

13. The non-transitory, computer-readable medium of claim 12, wherein the configuring status information of the placeholder element as status information corresponding to the client view comprises:
 setting width and height attributes of the placeholder element based on the client view.

14. The non-transitory, computer-readable medium of claim 10, wherein the adding the client view to the webpage view comprises:
 obtaining location information corresponding to each placeholder element from the result of loading the webpage view; and
 adding, to the webpage view, the client view corresponding to the placeholder element.

15. A computer-implemented system, comprising:
 one or more computers; and
 one or more computer memory devices interoperably coupled with the one or more computers and having tangible, non-transitory, machine-readable media storing one or more instructions that, when executed by the one or more computers, perform one or more operations comprising:
 receiving, by a computing device, a webpage view loading instruction to load code for a webpage view, wherein the webpage view is rendered by a browser application executing on the computing device;
 in response to receiving the webpage view loading instruction, loading, by the computing device, the code for the webpage view, the code including a placeholder element over which client view controls that are written using a development language associated with a mobile operating system are added when generating mixed views;
 obtaining location information indicating a current position of the placeholder element within a browser window of the browser application;
 generating a mixed view, comprising adding the client view control to the webpage view at the current position of the placeholder element within the browser window of the browser application; and
 providing the mixed view for presentation on a display.

16. The computer-implemented system of claim 15, the operations further comprising:
 before loading the webpage view, adding the placeholder element to the webpage view;
 defining identification information corresponding to each placeholder element of the webpage view; and
 setting a client view corresponding to each placeholder element.

17. The computer-implemented system of claim 16, wherein the placeholder element is represented as a block-level element.

18. The computer-implemented system of claim 17, the operations further comprising:
 after the adding the client view to the webpage view, configuring status information of the placeholder element as status information corresponding to the client view.

19. The computer-implemented system of claim 18, wherein the configuring status information of the placeholder element as status information corresponding to the client view comprises:
 setting width and height attributes of the placeholder element based on the client view.

20. The computer-implemented system of claim 16, wherein the adding the client view to the webpage view comprises:
 obtaining location information corresponding to each placeholder element from the result of loading the webpage view; and
 adding, to the webpage view, the client view corresponding to the placeholder element.

* * * * *

UNITED STATES PATENT AND TRADEMARK OFFICE
CERTIFICATE OF CORRECTION

PATENT NO. : 10,789,420 B2
APPLICATION NO. : 16/135604
DATED : September 29, 2020
INVENTOR(S) : Qiang Mou Page 1 of 1

It is certified that error appears in the above-identified patent and that said Letters Patent is hereby corrected as shown below:

On the Title Page

Column 1/ Line 3 – Below "PCT/CN2017/076421, filed on Mar. 13, 2017." Insert item (30) -- Foreign Application Priority Data Mar. 24, 2016 (CN) 201610172774.1 -- as a new field entry.

Signed and Sealed this
Twenty-second Day of December, 2020

Andrei Iancu
*Director of the United States Patent and Trademark Office*